United States Patent [19]

Suzuki

[11] Patent Number: 4,661,841

[45] Date of Patent: Apr. 28, 1987

[54] COLOR SIGNAL PROCESSING CIRCUIT

[75] Inventor: Susumu Suzuki, Kawasaki, Japan

[73] Assignee: Kabushiki Kaisha Toshiba, Kawasaki, Japan

[21] Appl. No.: 713,599

[22] Filed: Mar. 19, 1985

[30] Foreign Application Priority Data

Mar. 21, 1984 [JP] Japan ................................ 59-53808
Jun. 7, 1984 [JP] Japan ................................ 59-117067

[51] Int. Cl.⁴ ............................................. H04N 9/67
[52] U.S. Cl. .................................................... 358/27
[58] Field of Search ......................... 358/27, 31, 21 R

[56] References Cited

U.S. PATENT DOCUMENTS

| | | | |
|---|---|---|---|
| 3,836,707 | 9/1974 | Murakami et al. ................... | 358/31 |
| 3,875,583 | 4/1975 | Poetsch et al. ...................... | 358/27 |
| 4,216,493 | 8/1980 | Hosoya ............................. | 358/27 X |
| 4,398,209 | 8/1983 | Robitzsch .......................... | 358/27 |
| 4,556,900 | 12/1985 | Willis ............................... | 358/27 X |
| 4,568,967 | 2/1986 | Freyberger ......................... | 358/27 |
| 4,573,069 | 2/1986 | Lewis ............................... | 358/27 |

Primary Examiner—John M. Jillions
Attorney, Agent, or Firm—Cushman, Darby & Cushman

[57] ABSTRACT

Multiplier and multiplicand output means is connected to multiplier means having a multiplier and multiplicand input section. The multiplier and multiplicand output means produces second matrix coefficient signals in response to first matrix coefficient signals, automatic chroma control signal and adjustment signal. The second matrix coefficient signals are inputted to the multiplier on a time-sharing basis and are multiplied with an input digital chroma signal in this multiplier. The second matrix coefficient signals include an automatic chroma control component, color saturation control component and hue control component.

10 Claims, 10 Drawing Figures

| CH → | Q | I | Q | I | Q | I | Q | I | Q | I | Q | I | Q | I |
|---|---|---|---|---|---|---|---|---|---|---|---|---|---|---|
| K10 → | BQ2 | RI2 | RQ2 | GI2 | GQ2 | BI2 | BQ2 | RI2 | RQ2 | GI2 | GQ2 | BI2 | BQ2 | RI2 |
| | B-Y | | R-Y | | G-Y | | B-Y | | R-Y | | G-Y | | B-Y | |

COLOR SIGNAL PROCESSING CIRCUIT

BACKGROUND OF THE INVENTION

Field of the Invention

The present invention relates to a digital television device for converting an analog video signal to a digital video signal and processing the digital video signal and, more particularly, to a color signal processing circuit therefor.

Along with the development of digital IC techniques, signal processing at the baseband which was conventionally subjected to analog processing, can be digitally performed in a television receiver.

A digital signal processing circuit is capable of high-precision and nondistorted processing. Stable operation with regard to changes in temperatures, deterioration over time and noise can also be achieved. The digital signal processing circuit can be coupled to a memory or a computer for easily performing multiscreen television processing, scanning rate conversion, still image processing and other special effects. The digital signal processing circuit can also be coupled to various different media signals.

In a digital television system, in the same manner as in the conventional analog television system, automatic chroma control (ACC), color saturation control, hue control, chrominance signal demodulation and matrix operation are required. Many multipliers are required for this signal processing. As is well known to those skilled in the art, multiplier circuits are large. For example, in a multiplier network for multiplying data of 8×8 bits, about 1,000 gates are required. The large size of the multiplier is a critical problem in preparing a digital video signal processing IC.

Another problem is that a great number of circuits are required for the matrix operation. When the matrix operation is performed by a digital circuit, external R, G, B signals can be easily handled. One advantage, however, is that many additional components required for the analog matrix circuit can be omitted. There is a strong demand for a decrease in the number of components in the matrix circuit.

SUMMARY OF THE INVENTION

The present invention has been made in consideration of the above situation, and has as an object to provide a color signal processing circuit which reduces a great number of high-speed multipliers in color signal processing (ACC, color saturation, hue control and matrix operation).

In order to achieve the above object of the present invention, there is provided a color signal processing circuit, comprising:

a single multiplier having one input terminal which receives a digital chrominance signal; and means for time-divisionly inputting a plurality of matrix coefficient signals to the other input terminal of the multiplier in the plurality of matrix coefficient signals being multiplied with the digital chrominance signal to constitute a component for controlling the color saturation and hue of the digital chrominance signal and a component for converting the digital chrominance signal to a color-difference signal.

DESCRIPTION OF THE PREFERRED EMBODIMENTS

Preferred embodiments of the present invention will be described with reference to the accompanying drawings.

Figure 1:
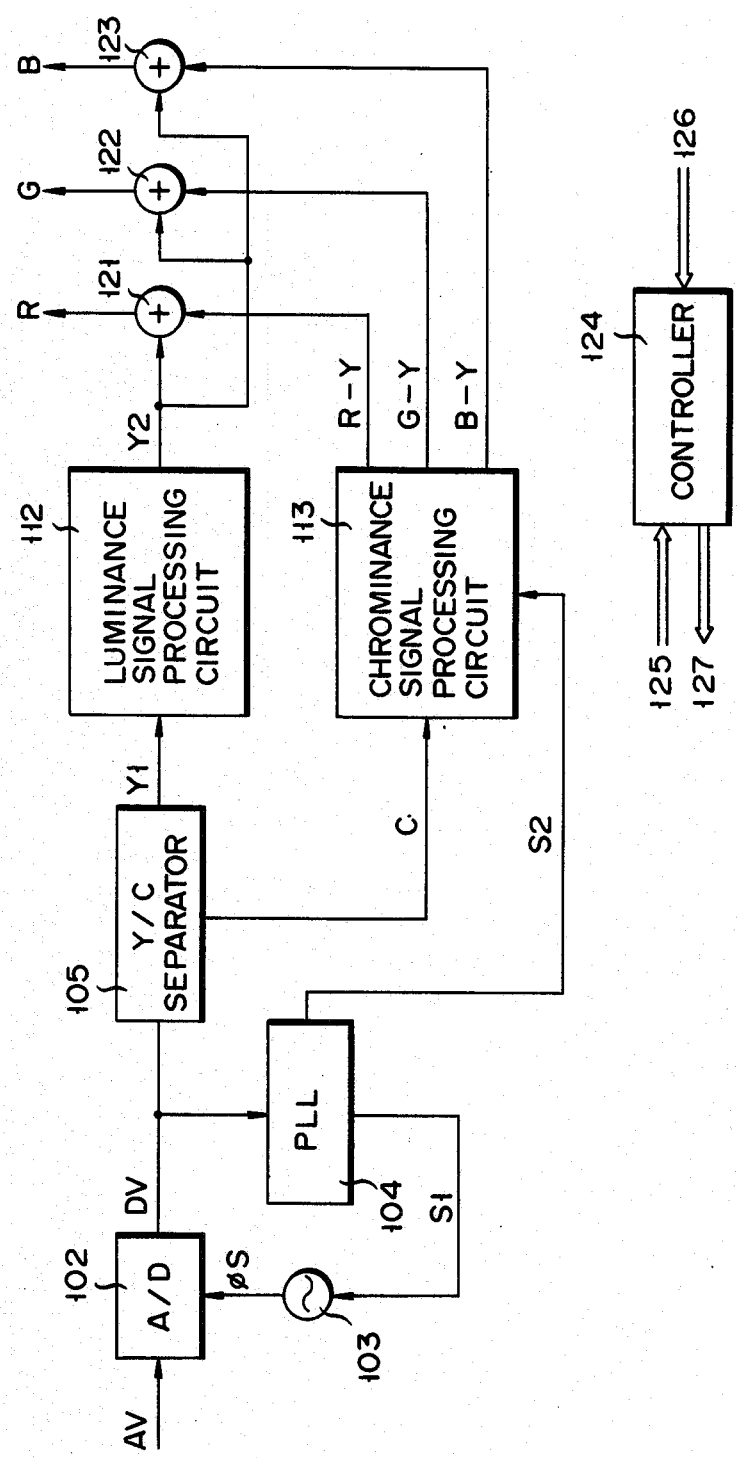
FIG. 1 is a block diagram of a digital television receiver.

FIG. 1 is a block diagram showing the overall configuration of a video signal processing system. An analog video signal AV is sampled and digitized by an analog-digital (A/D) converter 102 to a digital video signal DV. Sampling is performed in response to a sampling pulse $\phi S$ generated from a voltage-controlled oscillator (to be referred to as a VCXO hereinafter) 103. The sampling pulse $\phi S$ has a frequency four times the color subcarrier frequency $f_{SC}$ and a phase synchronized with the axes of color demodulation. In the following description, I and Q are the color demodulation axes. In this case, the sampling phases are $\pm I$ and $\pm Q$. Sampling phase control is performed by a phase-locked loop (PLL) circuit 104. During the color burst period of the digital video signal DV, the PLL circuit 104 calculates the sampling phase and generates a phase error signal S1 representing a difference between the sampling phase signal and the I, Q phases. The signal S1 controls the oscillation frequency of the VCXO 103 so that the phase of the sampling pulse $\phi S$ is synchronized with the I and Q phases. The sampling pulse $\phi S$ is supplied to the respective circuits as the reference clock for digital processing.

The digital video signal DV is separated by a luminance/chrominance separator (to be referred to as a Y/C separator) 105 into a luminance signal Y1 and a chrominance signal C. The signal Y1 is subjected to contour correction, and contrast and brightness control in a luminance signal processing circuit 112. The circuit 112 generates a new luminance signal Y2. The chrominance signal C is subjected to automatic chroma control (ACC), color saturation control, hue control, color demodulation and matrix operation in a chrominance signal processing circuit 113. The circuit 113 generates three color-difference signals R-Y, G-Y and B-Y. The circuit 113 receives a timing signal S2 from the PLL circuit 104. The signals R-Y, G-Y and B-Y are respectively added to the signal Y2 by adders 121, 122 and 123. The adders 121, 122 and 123 generate color signals R, G and B, respectively. These signals are converted to analog signals which drive a color CRT through an output circuit. A controller 124 receives an image quality control signal 125 used by a user to control the image quality, and a signal 126 supplied from the digital processing section to the controller 124 so as to operate various types of automatic control. The controller 124 processes the input signals 125 and 126 in accordance with a predetermined program. Signal processing parameters 127 from the controller 124 are supplied to the respective circuits of the digital processing section.

The general description of the digital processing section has been given as described above. The chrominance signal processing circuit 113 as the main feature of the present invention will be described hereinafter.

Figure 2:
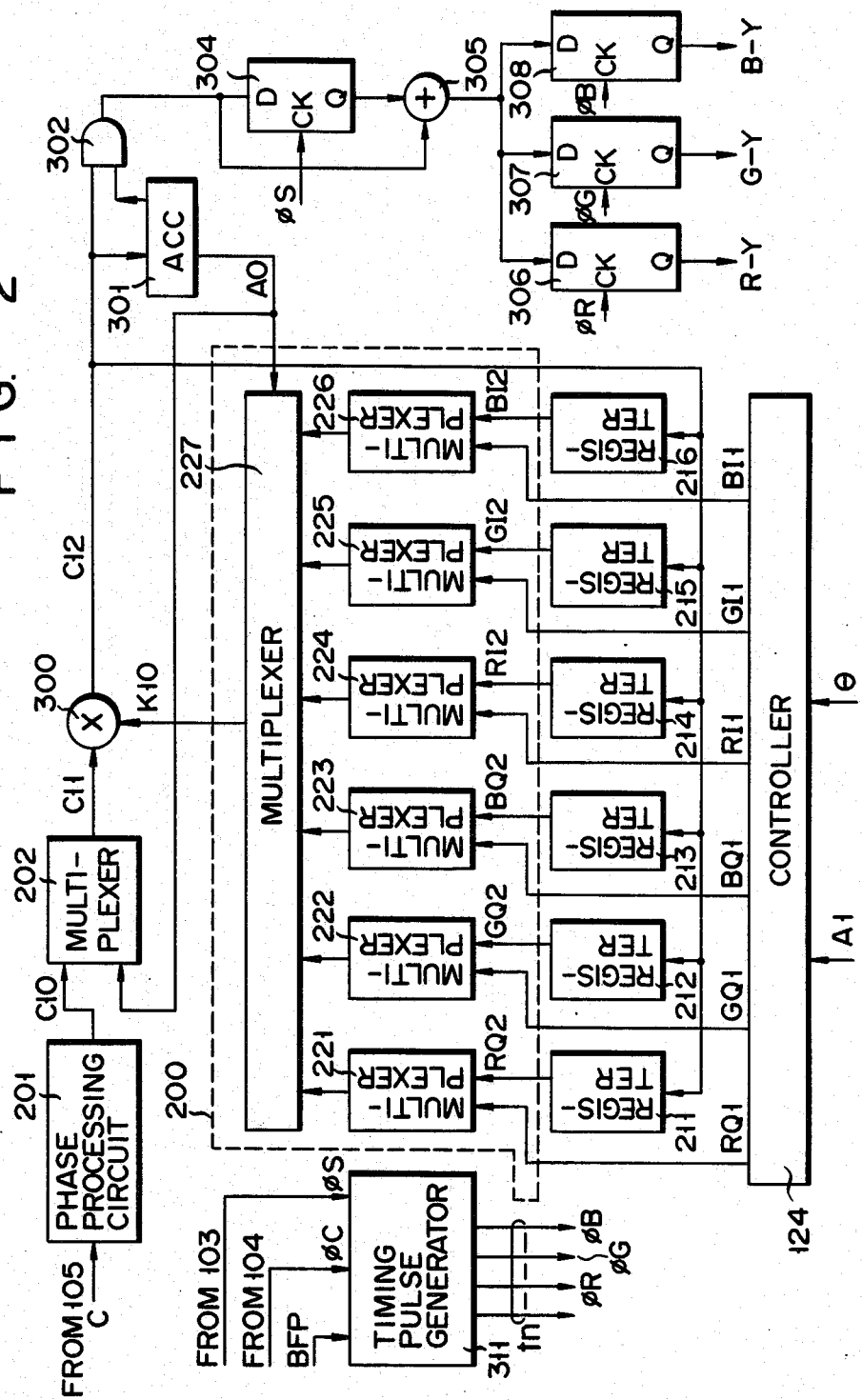
FIG. 2 is a block diagram of a digital signal processing circuit according to an embodiment of the present invention.

FIG. 2 is a block diagram of the circuit 113. The signal C from the Y/C separator 105 is supplied to a signal conversion section, i.e., a phase processing circuit 201. The circuit 201 converts all data of $-Q$ phase to those of $+Q$ phase and all data of $-I$ phase to those of $+I$ phase. The circuit 201 also converts the signal C to a chrominance signal C10 having a data format of ... Q, I, Q, I, Q, I ... Preprocessed signal conversion is performed so as to make the subsequent data processing easier. The signal C10 together with an ACC signal A0 from an ACC circuit 301 is supplied to a multiplexer 202. The output of the multiplexer 202 is supplied to a multiplier 300.

The ACC circuit 301 detects the amplitude of a color burst signal and controls the level of the ACC signal A0 in response to the detected amplitude, so that the amplitude of color burst signal approaches a predetermined value. The multiplexer 202 selects the signals A0 and C10. The output signal C11 from the multiplexer 202 is supplied to the multiplier 300. The output chrominance signal C11 has a format shown in FIG. 3. The signal C11 is the signal A0 during a period T0 and the signal C10 during periods T1 and T2.

The signal C11 supplied to the multiplier 300 is multiplied with an output signal K10 (the matrix coefficient and the ACC signal) from the multiplexer 227 in a time-division manner. An output signal C12 from multiplier 300 represents a color component which has been subjected to auto-color, color saturation and hue controls. The signal C12 is supplied through a color killer circuit to the matrix operation section for generating the color-difference signals.

The color killer circuit comprises, for example, an AND gate 302 and is controlled in response to a color killer signal from the ACC circuit 301. The color killer signal disables the AND gate 302 when the level of the color burst signal is lower than a predetermined value. The matrix operation section comprises a delay circuit 304, an adder 305 and registers 306 to 308. The registers (306 to 308) generate the R-Y, G-Y and B-Y signals, respectively.

A multiplier and multiplicand output section constituted by the multiplexer 202, multiplexers 221 to 227, registers 211 to 216 and the controller 124 will be described hereinafter.

A matrix coefficient output section 200 supplies, for example, a multiplier to a multiplier 300, and the multiplexer 202 supplies a multiplicand to the multiplier 300. The section 200 receives the signal C12, the signal A0 from the ACC circuit 301, and first matrix coefficients RQ1, GQ1, BQ1, RI1, GI1 and BI1 from the controller 124.

The section 200 has the registers 211 to 216 which both receive the output chrominance signal C12, the multiplexers 221 to 226 and a multiplexer 227. The registers 211 to 216 provide second matrix coefficients RQ2, GQ2, BQ2, RI2, GI2 and BI2 which are supplied to the multiplexers 221 to 226. The multiplexers 221 to 226 select one of the group of matrix coefficients RQ1 to BI1 and a group of matrix coefficients RQ2 to BI2. The output signal (i.e., the matrix coefficient) is supplied to the multiplexer 227. The multiplexer 227 selects the output pulses from the multiplexers 221 to 226 in a time-division manner and supplies the output signal K10 as a multiplicator to the multiplier 300.

Figures 3, 4:
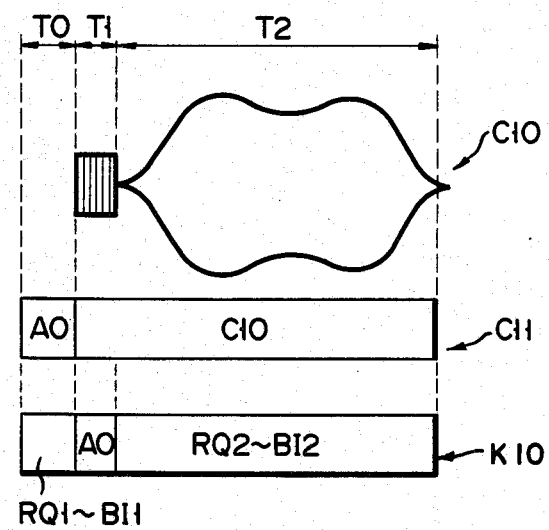
FIG. 3 is a timing chart for explaining the operation of the circuit shown in FIG. 2.
FIG. 4 is a table for explaining the calculation of the circuit shown in FIG. 2.

FIG. 3 shows the chrominance signals C10 and C11 for one horizontal period and the signal K10. The signal C11 serves as the multiplicand and the signal K10 serves as the multiplier.

During the nonsignal period T0, excluding the video period T2 and color burst signal period T1 in the one horizontal period as shown in FIG. 3, the multiplexer 202 generates the ACC signal A0, and the multiplexer 227 sequentially generates the first matrix coefficients RQ1 to BI1 as the signal K10. In this case, an output (product) of the multiplier 300 is sequentially stored in the registers 211 to 216. The respective outputs from the registers 211 to 216 are the second matrix coefficients RQ2 to BI2 which are the products of the first coefficients RQ1 to BI1 and the ACC signal A0.

The second matrix coefficients R02 to BI2 are obtained by the following equation.

$$\begin{pmatrix} RQ2 & RI2 \\ GQ2 & GI2 \\ BQ2 & BI2 \end{pmatrix} = A0 \cdot \begin{pmatrix} RQ1 & RI1 \\ GQ1 & GI1 \\ BQ1 & BI1 \end{pmatrix}$$

During the burst period, T1 of the chrominance signal C10, the multiplexer 202 selects the signal C10 from the phase processing circuit 201, and the multiplexer 227 selects the signal A0 from the ACC circuit 301. The multiplier 300 multiplies the color burst signal with the signal A0. A product from the multiplier 300 is supplied to the ACC circuit 301. The circuit 301 thus obtains a new ACC signal A0.

During the video period T2 of the signal C10, the multiplexer 202 selects the chrominance signal C10 from the circuit 201, and the multiplexers 227 and 221 to 226 sequentially select the matrix coefficients RQ2 to BI2 as the outputs received from the registers 211 to 216.

FIG. 4 shows a relationship between the signals C11 and K10 supplied to the multiplier 300 during the period T2. The color-difference signals are given as follows:

$$\begin{pmatrix} R - Y \\ G - Y \\ B - Y \end{pmatrix} = \begin{pmatrix} RQ2 & RI2 \\ GQ2 & GI2 \\ BQ2 & BI2 \end{pmatrix} \begin{pmatrix} Q \\ I \end{pmatrix}$$

When the output signal C12 from multiplier 300 is added to a signal delayed by one sampling period, the R-Y, G-Y and B-Y components appear for every other sampling period, as shown in FIG. 4. Thus, the R-Y, G-Y and B-Y components are extracted by registers 306, 307 and 308 to obtain the R-Y, G-Y and B-Y signals.

Figure 7:
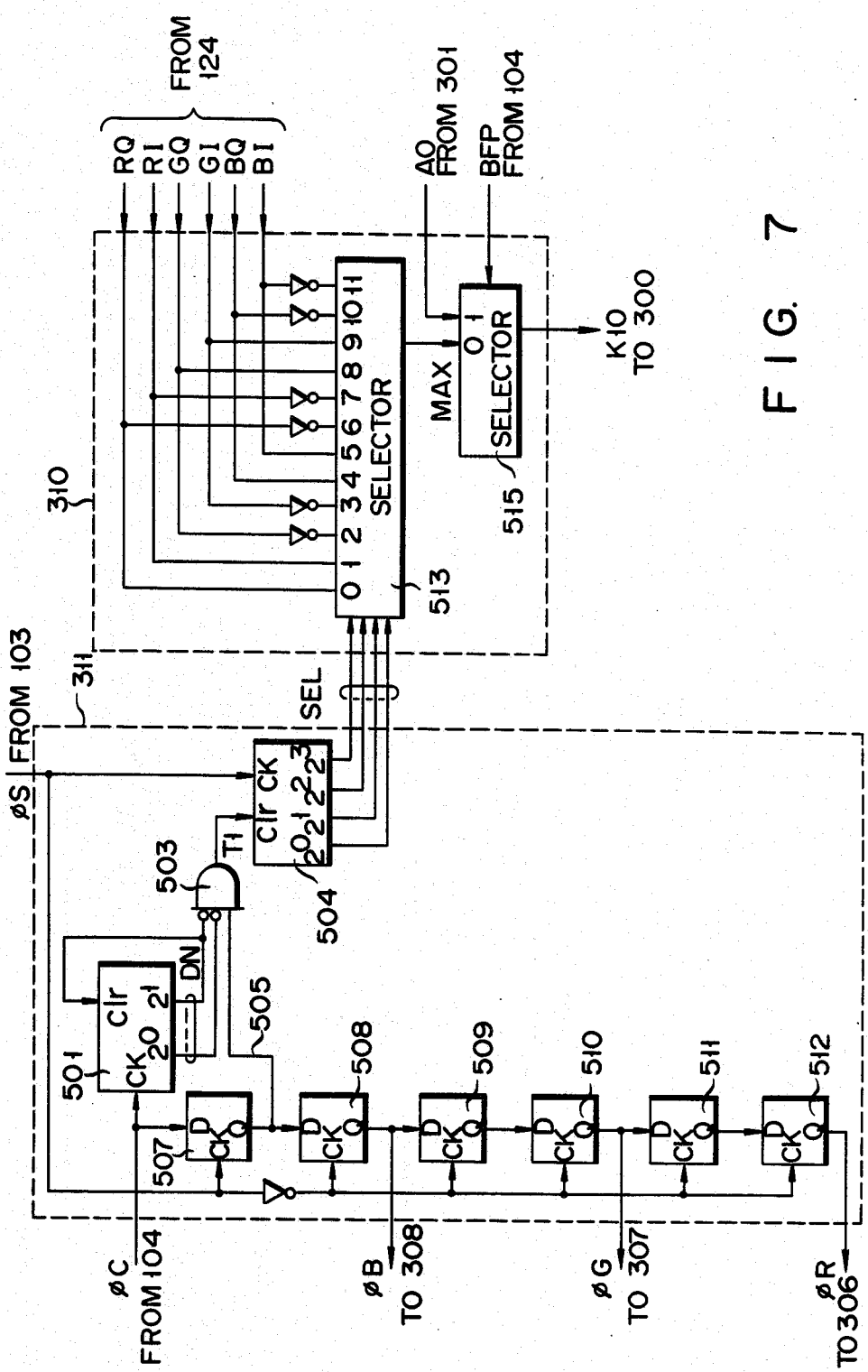
FIG. 7 is a circuit diagram of a data selector and a timing pulse generator of FIG. 5.

In order to separate and demodulate the color-difference signal R-Y, the signal is latched in the latch circuit 306 in response to an R-Y pulse φR. The color-difference signals G-Y and B-Y can be processed by latch circuits 307 and 308 respectively in response to G-Y and B-Y pulses φG and φB. The pulses φR, φG and φB are generated by the timing pulse generator 311. The timing pulse generator 311 produces the pulses φR, φG and φB by using a color demodulation pulse φC from the phase locked loop circuit 104, the sampling pulse φS from the VCXO 103 and a burst flag pulse BFP. The pulses φR, φG and φB are produced by latch circuits included in the timing pulse generator 311 as shown in FIG. 7. In this case, the signals R-Y, G-Y and B-Y have a latch period of six sampling periods corresponding to a frequency of 2.4 MHz. This frequency can be used in practice even in consideration of the sampling theorem and the bandwidth of the chrominance signal.

The first matrix coefficients RQ1 to BI1 supplied from the controller 124 will be described hereinafter.

The first matrix coefficients RQ1 to BI1 are expressed by the following equation:

$$\begin{pmatrix} RQ1 & RI1 \\ GQ1 & GI1 \\ BQ1 & BI1 \end{pmatrix} = A1 \cdot \begin{pmatrix} RQ0 & RI0 \\ GQ0 & GI0 \\ BQ0 & BI0 \end{pmatrix} \cdot \begin{pmatrix} \cos\theta & -\sin\theta \\ \sin\theta & \cos\theta \end{pmatrix}$$

wherein,

A1 is the color saturation degree adjustment signal controlled by the user,

θ is the hue adjustment signal controlled by user, RQ0, GQ0, BQ0, RI0, GI0, and BI0 are the reference matrix coefficients determined in accordance with the CRT characteristics.

Matrix coefficients RQ1 to BI1 include saturation and hue control data given by microprocessor control of the controller 124.

A timing signal tn, required for the above operation, is prepared by a timing pulse generator 311 using a burst flag pulse BFP, a color demodulation pulse φC and the sampling pulse.

According to the embodiment described above, nine multipliers used in the conventional color signal processing can be reduced to one multiplier by a combination of software processing and time-divisional matrix coefficient multiplications. The multiplication between the ACC signal A0 and the first matrix coefficient (the ACC signal A0 follows a variation of it for every one horizontal period), is performed by hardware using the nonsignal period T0, thereby greatly decreasing the software load. In addition, the software operations are also confined to those using the fixed values and the control signals from the users, thus further decreasing the software load. According to this embodiment, the software processing load can be decreased, and the amount of hardware is also decreased, thereby providing a color signal processing circuit suitably formed into an IC.

The present invention is not limited to the above embodiment. In the above embodiment, the data of −Q and −I phases of the chrominance signal C are converted by the circuit 201 to positive polarity data. However, when a means is provided for changing the polarity of the signal K10 supplied to the multiplier 300 so as to synchronize with the −Q and −I phases, the circuit 201 can be omitted.

The polarities of the chrominance signal C and the signal K10 supplied to the multiplier 300 need not be processed. In this case, the polarity of the output signal from the multiplier 300 is processed.

Figure 5:
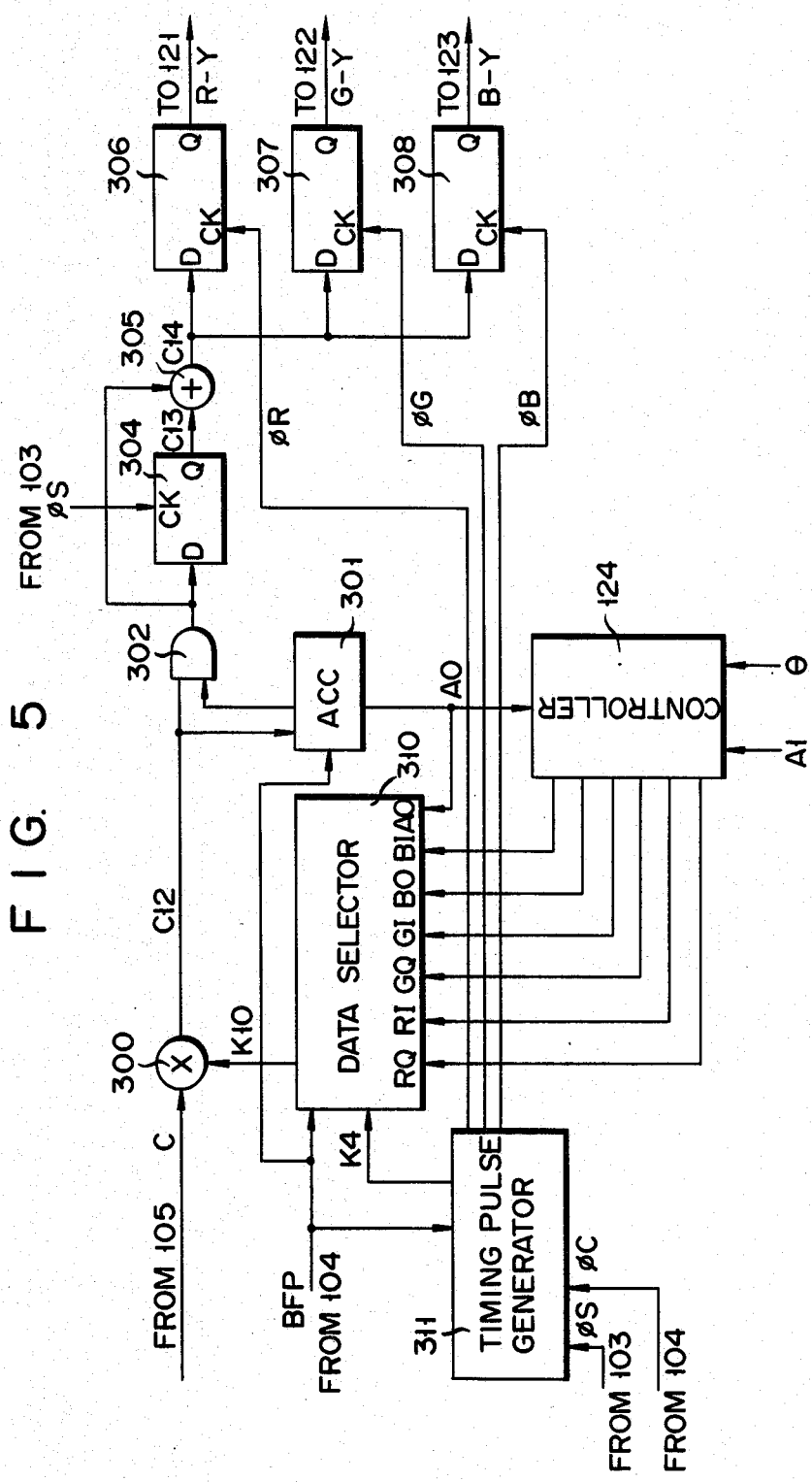
FIG. 5 is a block diagram of a digital signal processing circuit according to another embodiment of the present invention.

The present invention may also be exemplified by the circuit shown in FIG. 5. Referring to FIG. 5, the chrominance signal C from a Y/C separator 105 is supplied to a multiplier 300 and is multiplied with an output signal K10 received from a data selector 310. The data selector 310 corresponds to the matrix coefficient output section 200 of FIG. 1.

The data selector 310 receives the matrix coefficients RI, RQ, GI, GQ, BI and BQ generated from a controller 124 and data of an ACC signal generated from an ACC circuit 301. A select signal comprises a burst flag pulse BFP and a matrix coefficient select signal K4 for selecting one of the seven input signals.

Figure 6A:
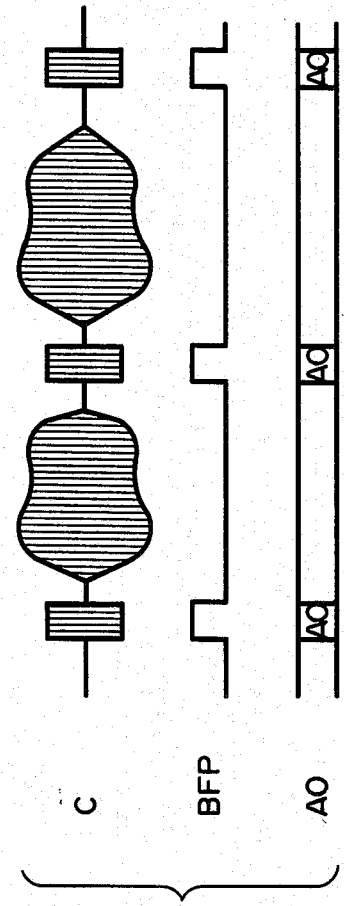
FIGS. 6A and 6B are respectively timing charts for explaining the calculations of the circuit shown in FIG. 5.
Figure 6B:
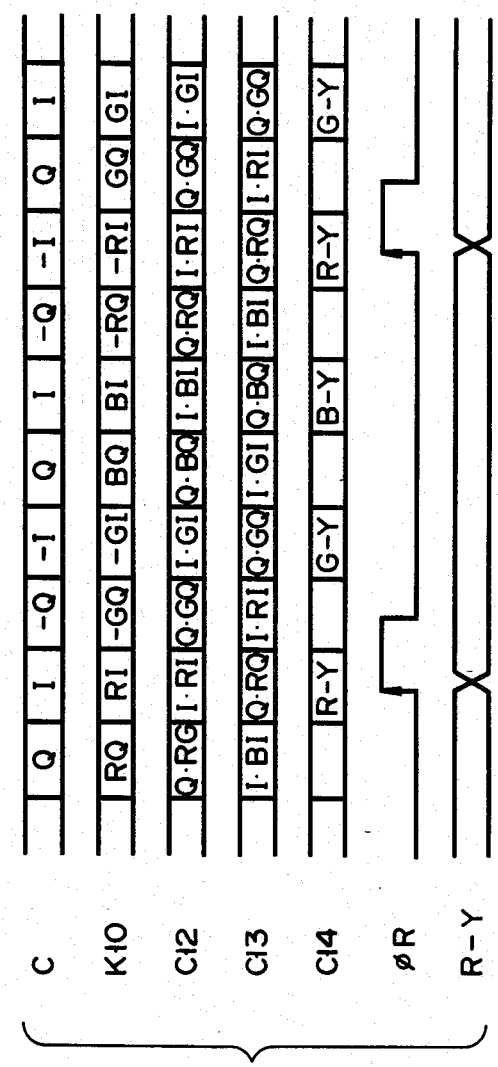

FIG. 6 is a timing chart for explaining the operation of the circuit shown in FIG. 5. The data selector 310 generates the signal A0 during the color burst period. The signal A0 is switched in response to the pulse BFP. FIG. 6A shows a relationship between the chrominance signal C, the pulse BFP and the signal A0. More specifically, the ACC operation is carried out during the color burst period. During this period, the ACC circuit 301 detects the amplitude of the color burst, and controls the amplitude to reach a predetermined value. Except during a period excluding the color burst period, the matrix coefficients RQ to BI are generated as the output signal K10 at a timing shown in FIG. 6B. More specifically, the coefficients ±RQ, ±GQ and ±BQ are generated when the phases of the signal C are set at the ±Q phases. However, the coefficients ±RI, ±GI and ±BI are generated when the phases of the signal C are set at the ±I phases. These sets of outputs are periodically selected and generated. As a result, the multiplier 300 sequentially generates components Q·RQ, I·RI, Q·GQ, I·GI, Q·BQ and I·BI as the output signal C12. Since the matrix operation can be expressed key the following equation;

$$\begin{pmatrix} R - Y \\ G - Y \\ B - Y \end{pmatrix} = \begin{pmatrix} RI & RQ \\ GI & GQ \\ BI & BQ \end{pmatrix} \begin{pmatrix} I \\ Q \end{pmatrix}$$

The color difference signals can be obtained by adding the signal C12 and its one sampling period delayed signal C13. The latch circuit 304 delays the signal C12 by one sampling period. A sum output C14 from the adder 305 derives R-Y, B-Y and G-Y components for every other sampling. In order to separate and demodulate the color-difference signal R-Y, the signal is latched by the latch circuit 306 in response to an R-Y pulse φR. The color-difference signals G-Y and B-Y can be processed by latch circuits 307 and 308 in response to G-Y and B-Y pulses φG and φB, respectively. Each of the signals R-Y, G-Y and B-Y has a latching period of six sampling periods corresponding to a frequency of 2.4 MHz. This frequency can be used in practice even in consideration of the sampling theorem and the bandwidth of the chrominance signal.

The controller 124 receives the signal A0 from the ACC circuit 301, and the color saturation signal A1 and the hue signal θ which are controlled by the user. An internal memory of the controller 124 stores reference matrix coefficients RI0, RQ0, GI0, GQ0, BI0 and BQ0 determined by the characteristics of the color CRT. The matrix coefficients RI, RQ, GI, GQ, BI and BQ are calculated by using the reference coefficients in the following manner:

$$\begin{pmatrix} RI & RQ \\ GI & GQ \\ BI & BQ \end{pmatrix} = A0 \cdot A1 \cdot \begin{pmatrix} RI0 & RQ0 \\ GI0 & GQ0 \\ BI0 & BQ0 \end{pmatrix} \begin{pmatrix} \cos\theta & -\sin\theta \\ \sin\theta & \cos\theta \end{pmatrix} \quad (1)$$

The chrominance signal C is multiplied with the above matrix coefficients RI, RQ, GI, GQ, BI and BQ so the ACC, color saturation and hue control operations are completed. Therefore, the demodulated signals R-Y, G-Y and B-Y will not require color processing (color saturation and hue processing). Now the timing pulse generator 311 and the data selector 310 as the main features of the present invention will be described in detail.

The relationship between the signal C and the output signal K10 generated from the data selector 310 is shown in FIG. 6B. This relationship is actually maintained by the timing pulse generator 311.

Figure 8:
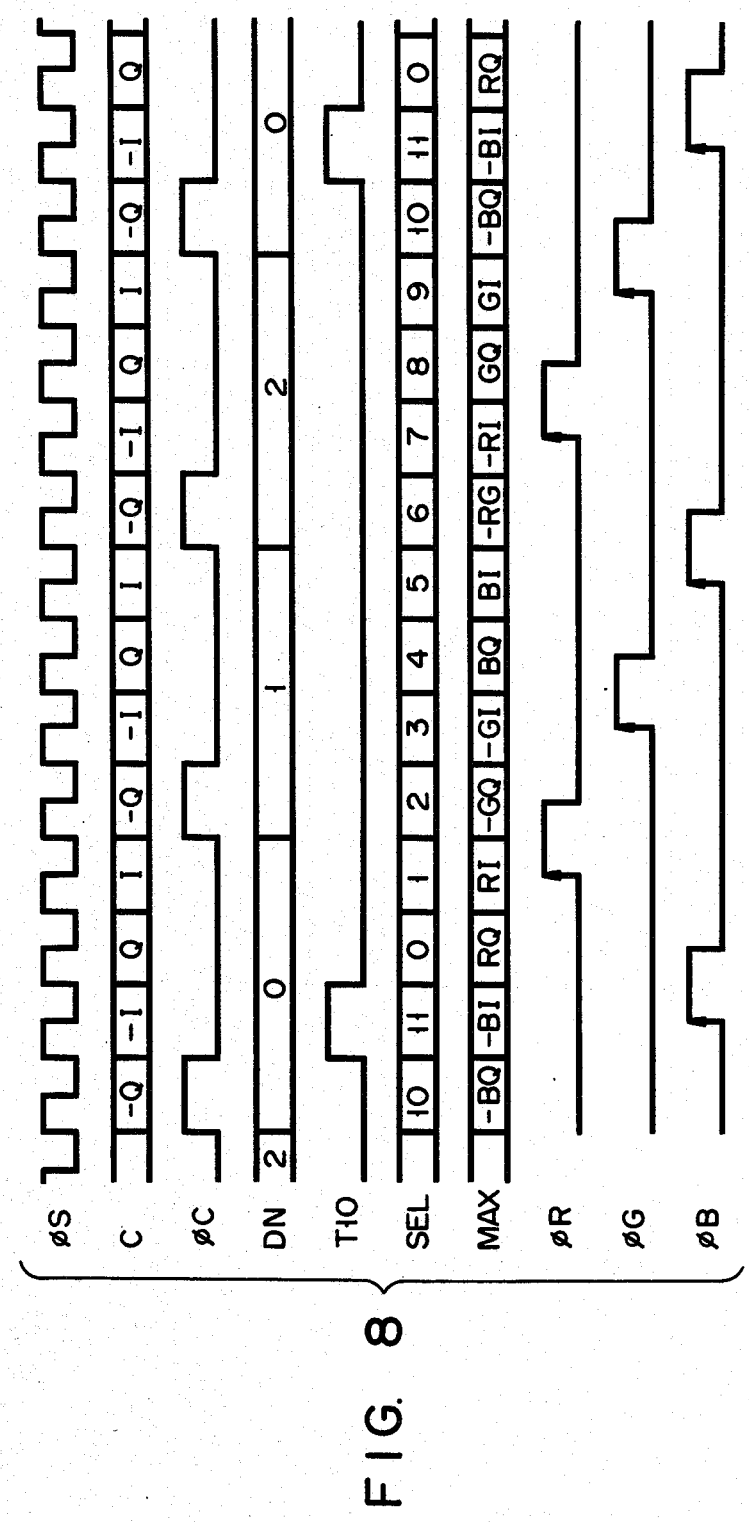
FIG. 8 is a timing chart for explaining the operation of the circuit shown in FIG. 5 and 7.

FIG. 7 is a detailed logic diagram of the generator 311 and the selector 310, and FIG. 8 is a timing chart for explaining the circuit arrangement of FIG. 7. Referring to FIG. 7, a selector 515 in the data selector 310 selects the signal A0 as the output signal K10 in response to the pulse BFP during the color burst period and a matrix signal MAX as the output signal K10 to the multiplier 300 during a period excluding the color burst period. As shown in FIG. 8, the matrix signal MAX has 12 matrix coefficients. A data selector 513 receives 12 positive and negative matrix coefficients and selects one of them one by one in response to a matrix coefficient select signal SEL. The signal SEL is derived from the color demodulation pulse $\phi C$ for $-Q$ phase from the PLL circuit 104 and the sampling pulse $\phi S$. The latch pulses $\phi R$, $\phi G$ and $\phi B$ for demodulating the signals R-Y, G-Y and B-Y are obtained by delaying the pulse $\phi C$ by a predetermined period of time. The generator 311 comprises counters 501 and 504, an AND gate 503 and a latch circuit 507 so as to generate the signal SEL. The latch circuit 507 is connected in series with latch circuits 508 to 512 so as to generate the latch pulses $\phi B$, $\phi G$ and $\phi R$. The sampling pulse $\phi S$ of FIG. 8 is used as a clock for the latch circuits 507 to 512 and for the counter 504. The pulse $\phi C$ is used as a data input to the latch circuit 507 and serves as a clock to the counter 501. FIG. 8 shows waveforms or contents of the sampling pulse $\phi S$, the chrominance signal C, the color demodulation pulse $\phi C$, and an output DN from the counter 501. FIG. 8 also shows an output pulse T10 from the AND gate 503. The pulse T10 is supplied to a clear terminal of the counter 504. The counter 504 generates the signal SEL obtained by converting the pulse $\phi S$ by duodecimal notation. The pulses $\phi B$, $\phi G$ and $\phi R$ are generated from the output terminals of the latch circuits 508, 510 and 512, respectively, as shown in FIG. 8.

The circuit arrangement described above only comprises about 200 gates. The circuit can be easily manufactured at low cost. Unlike a conventional circuit having nine multipliers, the circuit arrangement of the present invention reduces the multipliers to one by a combination of software processing and time-divisional matrix coefficient multiplications and the circuit can be advantageously used in an IC.

In the above embodiment, in order to use only one multiplier, preprocessing (i.e., the calculations given by matrix (1)) of matrix coefficients to be multiplied with the chrominance signal C is performed entirely by software. However, preprocessing of the matrix coefficients is not limited to this technique. Various changes and applications may be made in cooperation between software and hardware in accordance with the software capacity.

For example, the complicated operations in matrix (1) are caused by a coordinate rotation matrix for changing the hue:

$$\begin{pmatrix} \cos\theta & -\sin\theta \\ \sin\theta & \cos\theta \end{pmatrix}$$

The hue control can be performed using a technique for changing the sampling phase upon analog-digital conversion, thereby decreasing the software load. In this case, the controller 124 performs the following operation:

$$\begin{pmatrix} RI & RQ \\ GI & GQ \\ BI & BQ \end{pmatrix} = A0 \cdot A1 \cdot \begin{pmatrix} RI0 & RQ0 \\ GI0 & GQ0 \\ BI0 & BQ0 \end{pmatrix}$$

Excluding the signal A0 among the signals included in matrix (1), the signals are fixed values or semi-fixed values controlled by the subscriber. When the signal A0 is calculated by hardware, the processing speed of the software can be decreased. In this case, a circuit shown in FIG. 9 is used.

Figure 9:
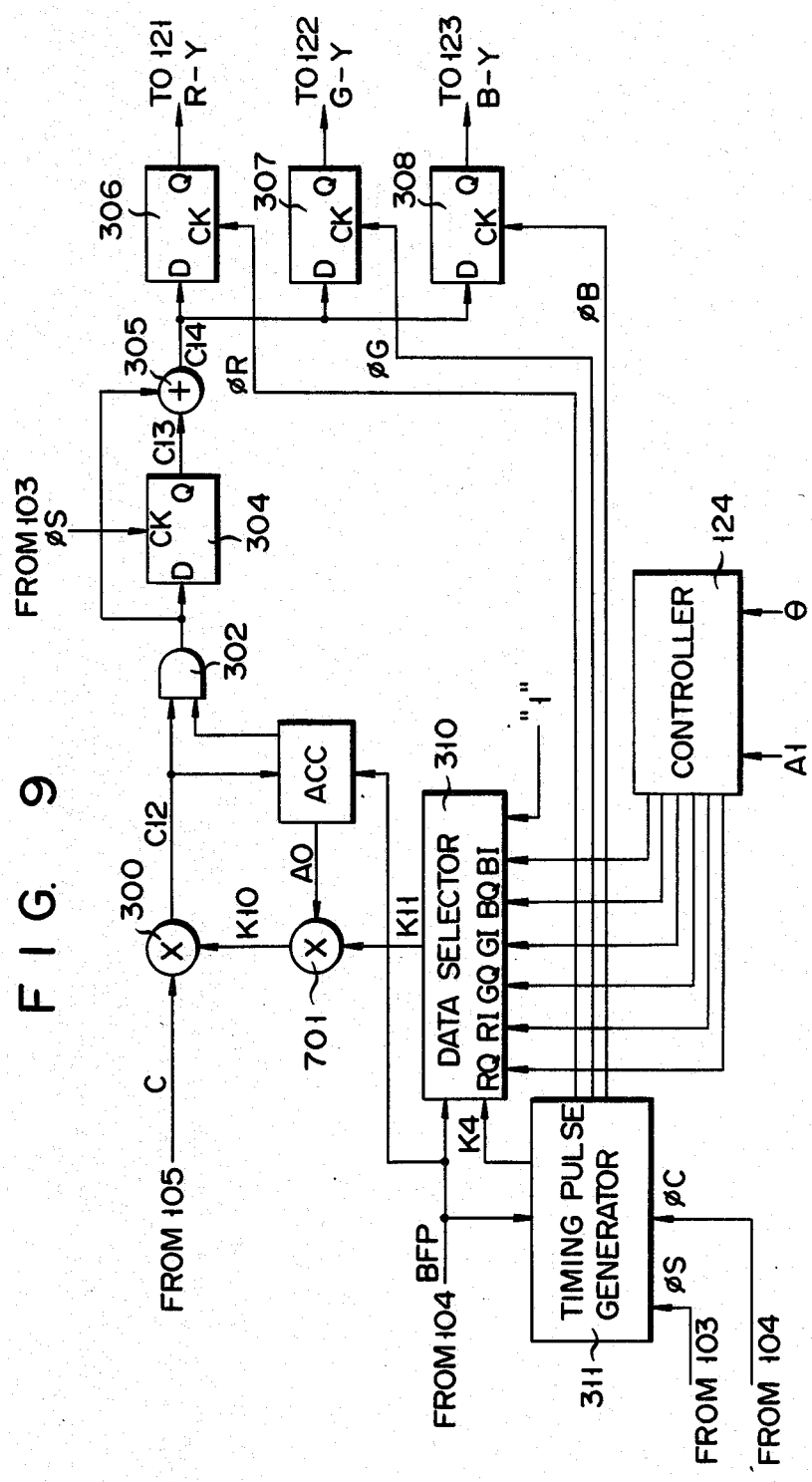
FIG. 9 is a diagram of a digital signal processing circuit according to still another embodiment of the present invention.

The circuit of FIG. 9 is substantially the same as that of FIG. 5, except that a multiplier 701 is added to multiply the output K11 from the selector 310 with the signal A0. An output K10 from the multiplier 701 is supplied to the multiplier 300. In this case, the signal A0 is not supplied to the controller 124 but directly multiplied by hardware with the matrix signal K11. Therefore, the controller 124 performs the following operation:

$$\begin{pmatrix} RI & RQ \\ GI & GQ \\ BI & BQ \end{pmatrix} = A1 \cdot \begin{pmatrix} RI0 & RQ0 \\ GI0 & GQ0 \\ BI0 & BQ0 \end{pmatrix} \cdot \begin{pmatrix} \cos\theta & -\sin\theta \\ \sin\theta & \cos\theta \end{pmatrix}$$

The output K10 is set at logic "1" during the color burst period. During this period, the signal C is multiplied with the signal A0, and automatic color signal gain control has top priority.

According to the present invention, the number of multipliers used in the conventional circuit can be greatly decreased, and the system can comprise only ICs. In particular, unlike the conventional matrix circuit having six multipliers, only one multiplier is used to perform time-divisional multiplication. Only one multiplier is required for the entire color signal processing circuit in cooperation with the software.

The matrix coefficients of the above-mentioned equations are disclosed by signs RI, GI, BI, RQ, GQ, and BQ. I and Q in these signs are used for indicating color demodulation axes. However, the color demodulation axes of this invention are not limited to general I and Q axes, thus they are disclosed by X and Y.

What is claimed is:

1. A color signal processing circuit comprising:
   multiplier means for receiving a first digital chroma signal and a second signal and producing a third signal which represents the multiplication of said first and second signals;

means for transmitting said first signal to said multiplier means;

matrix coefficient means responsive to said third signal for generating a plurality of matrix coefficients, said matrix coefficient means including a first selector means for selecting said matrix coefficients in time division manner and for producing said second signal; and ACC means, connected between said multiplier means and said matrix coefficient means, for generating an ACC signal upon application of said third signal.

2. A color signal processing circuit according to claim 1, wherein said transmitting means includes a second selector means which selects said ACC signal during the nonsignal period of said digital chroma signal and selects said digital chroma signal during the burst and video signal periods of said digital chroma signal.

3. A color signal processing circuit according to claim 1, wherein said matrix coefficient means provides first matrix coefficients and second matrix coefficients;

said first selector means selects said first matrix coefficients as said second signal during the nonsignal period of said digital chroma signal and selects said ACC signal as said second signal during the burst signal period of said digital chroma signal and selects said second matrix coefficients during the video period of said digital chroma signal; and wherein said second matrix coefficients are the multiplication of said ACC signal and said first matrix coefficients.

4. A color signal processing circuit according to claim 3, wherein said matrix coefficient means further includes register means for storing said second matrix coefficients, and includes second selector means for selecting said first matrix coefficients and said second matrix coefficients stored in said register means.

5. A color signal processing circuit according to claim 4, wherein said matrix coefficient means further comprises, adjusting means for adjusting said first matrix coefficients by an arithmetic operation of $$\begin{pmatrix} RX1 & RY1 \\ GX1 & GY1 \\ BX1 & BY1 \end{pmatrix} = A1 \cdot \begin{pmatrix} RX0 & RY0 \\ GX0 & GY0 \\ BX0 & BY0 \end{pmatrix} \cdot \begin{pmatrix} \cos\theta & -\sin\theta \\ \sin\theta & \cos\theta \end{pmatrix}$$

whereby color saturation and hue are controlled, where,

RX1, GX1, BX1, RY1, GY1 and BY1 are the first matrix coefficient signals,

A1 is the adjust color saturation degree adjustment signal,

RX0, GX0, BX0, RY0, GY0, and BY0 are the predetermined first matrix coefficient signals, θ is the hue adjustment signal, and where said second matrix coefficients RX2, GX2, BX2, RY2, GY2, and BY2 are obtained by an arithmetic operation of $$\begin{pmatrix} RX2 & RY2 \\ GX2 & GY2 \\ BX2 & BY2 \end{pmatrix} = A0 \cdot \begin{pmatrix} RX1 & RY1 \\ GX1 & GY1 \\ BX1 & BY1 \end{pmatrix}$$

where, said A0 is the ACC signal.

6. A color signal processing circuit according to claim 1, further comprising:

delay means connected to said multiplier means for delaying said third signal by a given period and for producing a delayed signal; and means for adding said third signal and delayed signal for producing a color difference signal.

7. A color signal processing circuit according to claim 1, wherein said transmitting means substantially transmits said digital chroma signal; and said first selector means selects said ACC signal during the burst signal period of said digital chroma signal, and selects said matrix coefficients during the video period of said digital chroma signal.

8. A color signal processing circuit according to claim 7, wherein said matrix coefficient means comprises;

adjusting means for adjusting said matrix coefficients RX, GX, BX, RY, GY and BY by an arithmetic operation of $$\begin{pmatrix} RX & RY \\ GX & GY \\ BX & BY \end{pmatrix} = A0 \cdot A1 \cdot \begin{pmatrix} RX0 & RY0 \\ GX0 & GY0 \\ BX0 & BY0 \end{pmatrix} \cdot \begin{pmatrix} \cos\theta & -\sin\theta \\ \sin\theta & \cos\theta \end{pmatrix}$$

whereby color saturation and hue are controlled, where,

A1 is the color saturation degree adjustment signal,

θ is the hue adjustment signal,

A0 is the ACC signal,

RX0, GX0, BX0, RY0, GY0, and BY0 are the predetermined first matrix coefficient signals.

9. A color signal processing circuit comprising:

multiplier means for receiving a first digital chroma signal and a second signal and producing a third signal which is multiplication of said first and second signals;

ACC means connected to said multiplier means for generating an ACC signal in response to said third signal;

data selector means for providing matrix coefficients in time division manner;

a multiplier for multiplying said matrix coefficients and said ACC signal, and for producing said second signal;

adjusting means for adjusting said matrix coefficients W by an arithmetic operation $$A1 \cdot \begin{pmatrix} RX0 & RY0 \\ GX0 & GY0 \\ BX0 & BY0 \end{pmatrix} \cdot \begin{pmatrix} \cos\theta & -\sin\theta \\ \sin\theta & \cos\theta \end{pmatrix} = W,$$

said multiplier performing an operation of W×A in order to obtain said second signal, where, RXO, GXO, BXO, RYO, GYO, and BYO are the predetermined first matrix coefficient signals, A1 is the color saturation degree adjustment signal, θ is the hue adjustment signal, and A0 is the ACC signal.

10. A color signal processing circuit according to claim 9, further comprising;

delay means connected to said multiplier means, for delaying said third signal by a given period and for producing a delayed signal, means for adding said third signal and delayed signal, for producing a color difference signal.

* * * * *